J. Johnson,

Automatic Gate,

No. 1,121. Reissued Jan. 8. 1861.

Witnesses;
James Blaney
G. Ritley

Inventor;
Jasper Johnson
per Geo Patten
atty.

N. PETERS, PHOTO-LITHOGRAPHER, WASHINGTON, D. C.

UNITED STATES PATENT OFFICE.

JASPER JOHNSON, OF GENESEO, NEW YORK.

IMPROVED GATE.

Specification forming part of Letters Patent No. 27,637, dated March 6, 1860; Reissue No. 1,121, dated January 8, 1861.

*To all whom it may concern:*

Be it known that I, JASPER JOHNSON, of Geneseo, in the county of Livingston and State of New York, have invented a new and useful Improvement in Gates; and I do hereby declare that the following is a full, clear, and exact description of the construction and operation of the same, reference being had to the annexed drawings, forming part of this specification, in the several figures of which similar characters of reference denote the same part.

Figure 1:
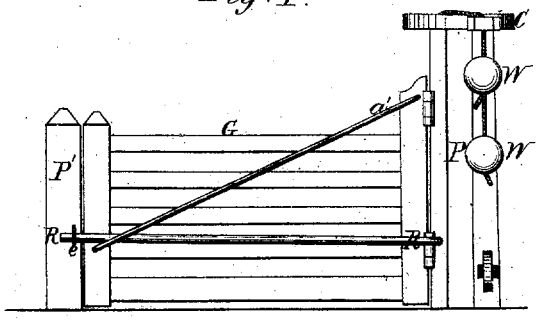
Figure 2:
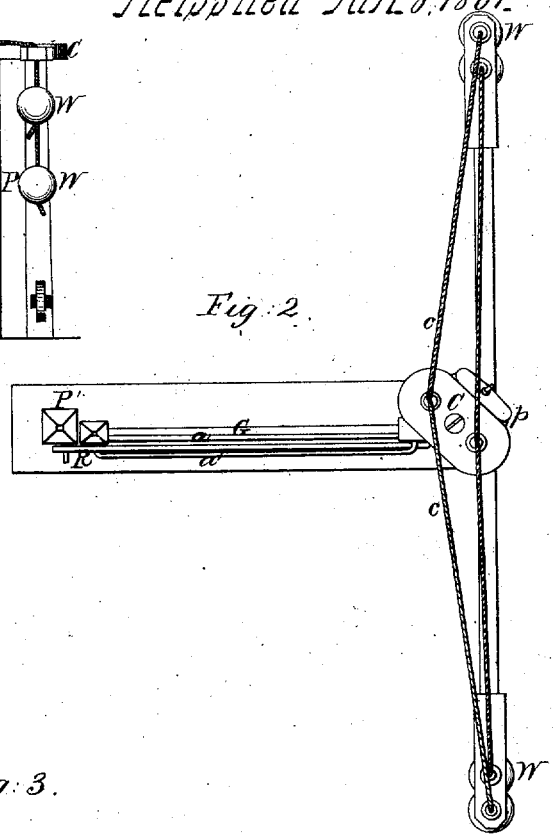
Figure 3:
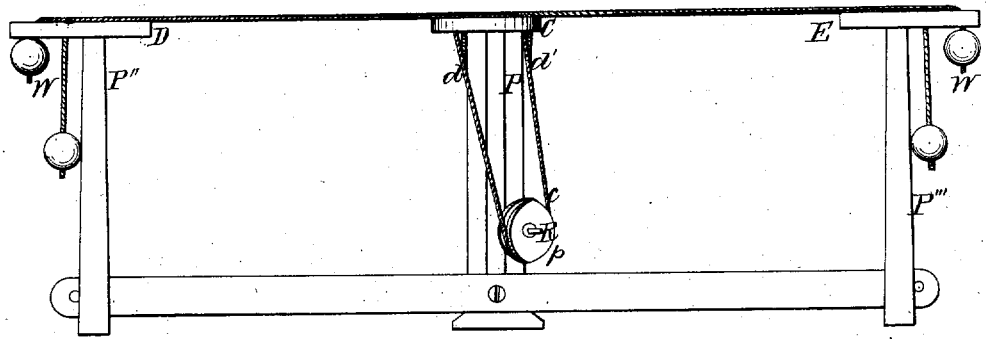

Figure 1 is a side view of gate, showing posts and conections therewith. Fig. 2 is a top view of the same. Fig. 3 is a view showing gate-post and operating-cords.

The nature of my invention consists in a peculiar manner of the opening and closing gates by the alternate semi-revolution of a bent rod or bar working between guides upon the faces of the gate, the rod being so connected with the supporting-post that said movement will turn the gate upon its hinges the requisite distance, the details of construction and operation being substantially as set forth.

In the drawings, G is the gate, hung between posts P P′, and having upon its face guides such as shown at *a a′*, between which passes a bar or rod, R, running through post P, and having on its protruding end a pulley, *p*, Fig. 3. The turning of this pulley causes the bent rod to revolve and by pressure upon the guides operate the gate, the revolving of the rod and its action upon the gate being the feature of the invention.

The manner in which the rod is revolved in the construction shown in the drawings is as follows: To the pulley *p* is permanently fastened a cord, *c*, branching at each extremity, as seen at *d d′*, and running through a cap, C, on the head of post P. These cords are carried through caps D and E on posts P″ P′′′ on opposite sides of the gate when closed, and have weights *w* pendent from their extremities.

By drawing upon the elevated weight on either side the rod R is turned and the gate operated, the angle at which the rod is bent and the angle at which it is inserted in the post determining the swing of the gate. This rod, moreover, serves as a brace when the gate is at either extreme position.

Having described my invention and the operation thereof, I claim—

Operating a gate upon its hinges by the alternate partial rotation of a bent rod or bar, one branch of which moves between guides on the face of the gate, the other branch being inserted into the supporting-post, said partial rotation being effected by the devices described or their equivalents.

Signed this 19th day of December, 1860.

Witnesses: JASPER JOHNSON.

RANDOLPH COYLE, Jr.,
WM. JACOBUS,
THOMAS C. DONN.